US008749374B2

(12) United States Patent
Yamamura et al.

(10) Patent No.: US 8,749,374 B2
(45) Date of Patent: Jun. 10, 2014

(54) MONITORING SYSTEM FOR VEHICLE

(75) Inventors: Makoto Yamamura, Saitama (JP); Yoshinori Masubuchi, Saitama (JP); Hiroo Kanke, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 951 days.

(21) Appl. No.: 12/617,353

(22) Filed: Nov. 12, 2009

(65) Prior Publication Data

US 2010/0123574 A1 May 20, 2010

(30) Foreign Application Priority Data

Nov. 14, 2008 (JP) ................................ 2008-292614

(51) Int. Cl.

| | |
|---|---|
| ***G08B 1/08*** | (2006.01) |
| ***G08B 23/00*** | (2006.01) |
| ***G08B 21/00*** | (2006.01) |
| ***G08B 13/14*** | (2006.01) |
| ***B60R 21/00*** | (2006.01) |
| ***B60L 1/00*** | (2006.01) |
| ***H01H 35/14*** | (2006.01) |
| ***G06F 17/10*** | (2006.01) |
| ***G05D 1/00*** | (2006.01) |

(52) U.S. Cl.
USPC ..................... 340/539.1; 340/573.1; 340/531; 340/572.4; 108/282; 307/10.1; 307/121; 701/301; 701/25

(58) Field of Classification Search
CPC .......... G08B 1/00; G08B 23/00; G08B 29/00; G08B 2001/00; G08B 25/001; B60L 1/00; B60L 3/00; B60L 8/00; B60L 11/00; B60L 2200/00; B60L 2200/12; B60L 2200/16; B60L 2200/24; B60L 2200/34; B60L 2200/40; B60L 2250/00; B60L 2250/22; B60L 2260/22; B60L 2260/28; B60L 11/002; B60L 11/18; B60L 2210/00; A61G 2203/22; B60R 2225/00; B60R 2300/70
USPC .............. 340/539.1, 903, 905, 435, 992, 989, 340/573.1, 573.7, 539.12, 665, 686.1; 701/23, 27, 213, 93, 300, 301, 117, 701/217; 180/282, 167–170; 342/29, 41, 342/454, 455, 357.07
See application file for complete search history.

(56) References Cited

U.S. PATENT DOCUMENTS

| | | | | |
|---|---|---|---|---|
| 5,311,197 A * | 5/1994 | Sorden et al. | ................. | 342/457 |
| 5,317,937 A * | 6/1994 | Yoshizawa et al. | ........... | 477/120 |
| 6,275,773 B1 * | 8/2001 | Lemelson et al. | ............ | 701/301 |

(Continued)

FOREIGN PATENT DOCUMENTS

| | | |
|---|---|---|
| JP | 2003-061201 A | 2/2003 |
| JP | 2004-078393 A | 3/2004 |
| JP | 2007-112363 A | 5/2007 |

*Primary Examiner* — Jennifer Mehmood
*Assistant Examiner* — Mirza Alam
(74) *Attorney, Agent, or Firm* — Arent Fox LLP

(57) ABSTRACT

In a monitoring system for a power wheelchair (low-speed mobility vehicle) and having a remote monitoring device connected to the wheelchair through a communicator, it is determined whether the wheelchair strands based on detected acceleration, and when it does, a vehicle-stranded signal that the vehicle strands is transmitted to the remote monitoring device through the communicator and predesignated information addressees including a dealer, a data terminal owned by the operator's family and emergency assistance providers such as the police or hospital are informed in response to the signal that the vehicle is stranded, thereby enabling to respond rapidly and appropriately when the wheelchair becomes stranded.

8 Claims, 5 Drawing Sheets

(56) References Cited

U.S. PATENT DOCUMENTS

| | | | | |
|---|---|---|---|---|
| 6,397,133 | B1 | 5/2002 | Van Der Pol et al. | |
| 6,972,677 | B2 * | 12/2005 | Coulthard | 340/531 |
| 2001/0043011 | A1 * | 11/2001 | Ugusa et al. | 307/10.1 |
| 2003/0050039 | A1 * | 3/2003 | Baba et al. | 455/404 |
| 2004/0006422 | A1 * | 1/2004 | Fehr et al. | 701/200 |
| 2004/0267442 | A1 * | 12/2004 | Fehr et al. | 701/200 |
| 2005/0037730 | A1 * | 2/2005 | Montague | 455/404.2 |
| 2005/0205057 | A1 * | 9/2005 | Yamashita | 123/406.58 |
| 2008/0135321 | A1 * | 6/2008 | Ripple et al. | 180/282 |

* cited by examiner

MONITORING SYSTEM FOR VEHICLE

BACKGROUND OF THE INVENTION

1. Field of the Invention

This invention relates to a monitoring system for a vehicle, particularly to a monitoring system for a low-speed mobility vehicle such as a power wheelchair.

2. Description of the Related Art

Recent years have seen the spread of low-speed mobility vehicles such as power wheelchairs that travel at very low speeds comparable to human walking speed and are suitable for use by the elderly and others with walking difficulties. An example can be found in Japanese Laid-Open Patent Application No. 2007-112363.

The low-speed mobility vehicle of the aforesaid type may become stranded during travel (as when a wheel falls into a gutter or the vehicle collides with an object (obstacle)). In such a situation, the operator must seek help by contacting a vehicle dealer's service desk, a family member or other suitable source of assistance, or ask a passerby to call for help. The operator is therefore inconvenienced by the long time it takes to find assistance after the low-speed mobility vehicle becomes stranded.

This inconvenience can be eliminated by providing the low-speed mobility vehicle a remote monitoring device with communication capability in a configuration wherein the remote monitoring device contacts a suitable source of assistance as soon as the low-speed mobility vehicle becomes stranded. The reference is totally silent on this point.

SUMMARY OF THE INVENTION

The object of this invention is therefore to overcome the aforesaid drawback by providing a monitoring system for a vehicle, particularly to a low-speed mobility vehicle having a remote monitoring device and capable of responding rapidly and appropriately when the low-speed mobility vehicle becomes stranded.

In order to achieve the object, this invention provides, in a first aspect, a system for monitoring a low-speed mobility vehicle and having a remote monitoring device adapted to be connected to the low-speed mobility vehicle through a communicator, comprising: an acceleration sensor that is installed at the vehicle to produce an output indicative of acceleration acting on the vehicle; a vehicle-stranding determiner that is installed at the vehicle and determines whether the vehicle strands based on the detected acceleration of the vehicle; a vehicle-stranded signal transmitter that is installed at the vehicle and transmits a vehicle-stranded signal indicating that the vehicle strands to the remote monitoring device through the communicator; and an informer that is installed at the remote monitoring device and informs to a predesignated information addressee in response to the signal that the vehicle is stranded.

In order to achieve the object, this invention provides, in a second aspect, a method of monitoring a low-speed mobility vehicle using a remote monitoring device adapted to be connected to the low-speed mobility vehicle through a communicator, comprising the steps of: detecting acceleration acting on the vehicle; determining whether the vehicle strands based on the detected acceleration of the vehicle; transmitting a vehicle-stranded signal indicating that the vehicle strands to the remote monitoring device through the communicator; and informing to a predesignated information addressee in response to the signal that the vehicle is stranded.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
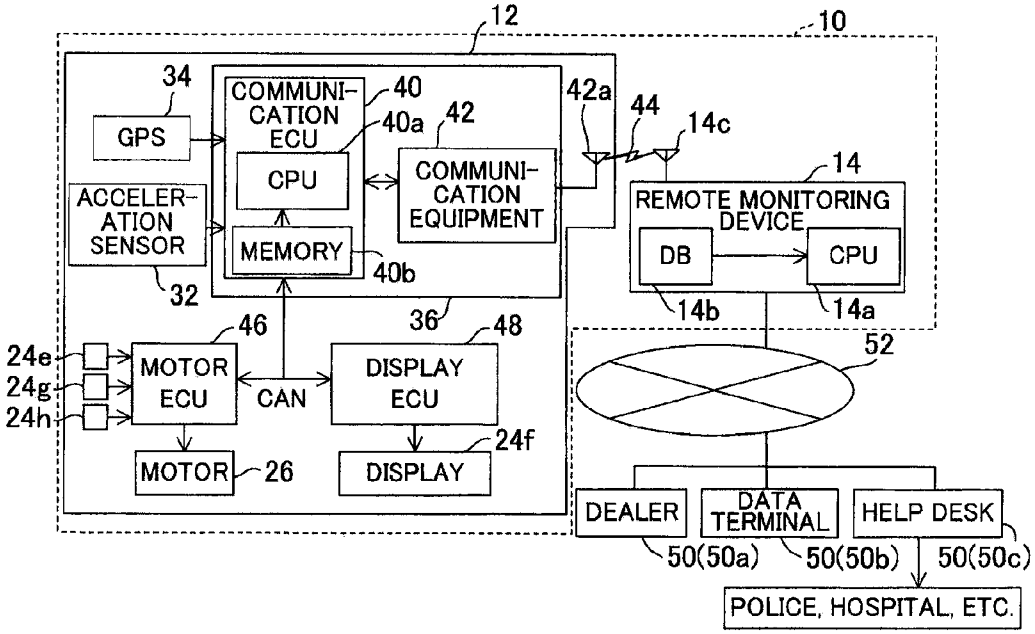
FIG. 1 is a block diagram showing the overall configuration of a monitoring system for a vehicle according to an embodiment of this invention.

FIG. 1 is a block diagram showing the overall configuration of a monitoring system for a vehicle according to an embodiment of this invention.

In FIG. 1, the reference numeral 10 designates the monitoring system for a vehicle, particularly to a low-speed mobility vehicle 12. The monitoring system 10 comprises equipments mounted on the low-speed mobility vehicle 12 and a remote monitoring device 14 communicatably connected to the equipments mounted on the low-speed mobility vehicle 12.

Figure 2:
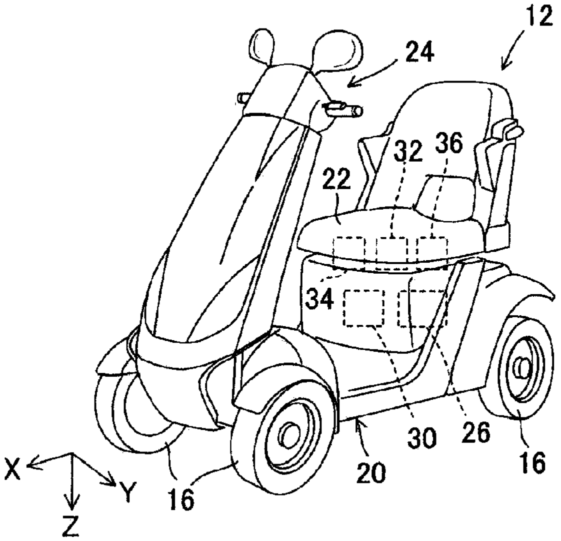
FIG. 2 is a perspective view of a low-speed mobility vehicle shown in FIG. 1.

FIG. 2 is a perspective view of the low-speed mobility vehicle 12.

As shown in FIG. 2, the low-speed mobility vehicle 12 comprises a vehicle body frame 20 supported by four wheels 16 (one of which is not shown in FIG. 2), a seat 22 provided on the body frame 20 to be seated by an operator (operator/user) not shown in the drawing, and an operating unit 24 provided for manual operation by the operator. The low-speed mobility vehicle 12 is designed for use by, for example, an elderly person. It is a relatively small, single-passenger electrically powered vehicle that travels at a very low speed comparable to human walking speed. As it is in essence a power wheelchair, the low-speed mobility vehicle 12 will hereinafter sometimes be called the "power wheelchair 12."

Under the seat 22 are installed an electric motor 26 for driving the (rear) wheels 16 and a battery 30 for supplying operating power to the motor 26 or the like. The motor 26 is a DC brushless motor.

Between the seat 22 and body frame 20 are installed an acceleration sensor 32 that produces an output or signal indicative of acceleration G acting on the power wheelchair (subject vehicle) 12, a GPS signal receiver (location finder) 34 for receiving GPS (Global Positioning System) signals and a communication unit 36 communicatably connected to the remote monitoring device 14.

The single acceleration sensor 32 is installed under the seat 22 near the center of gravity of the power wheelchair 12 and produces outputs or signals indicative of the Gx, Gy and Gz acceleration components acting on the power wheelchair 12 in the X, Y and Z axis (three axial) directions. As shown in FIG. 2, the X axis lies in the fore-aft (longitudinal) direction of the power wheelchair 12, the Y axis in its lateral direction, and the Z axis in its vertical direction. The GPS signal receiver 34 produces an output representing location data and the like regarding the power wheelchair 12 acquired from the GPS signals.

Figure 3:
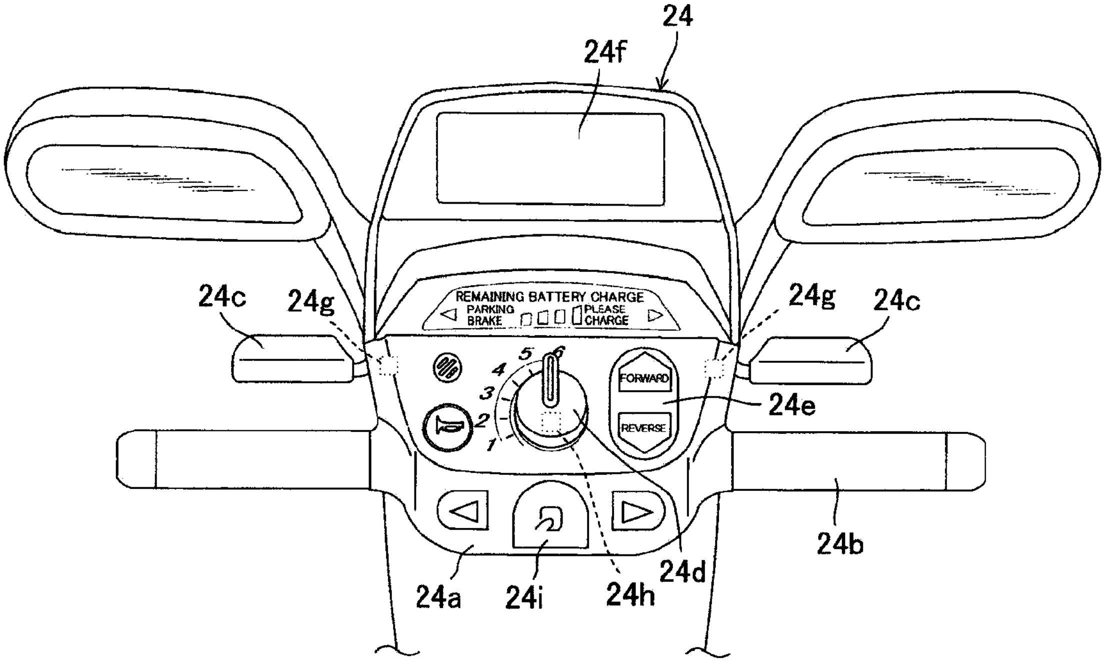
FIG. 3 is an enlarged front view of an operating unit of the low-speed mobility vehicle shown in FIG. 2.

FIG. 3 is an enlarged front view of the operating unit 24 of the power wheelchair 12 shown in FIG. 2.

As shown in FIG. 3, the operating unit 24 is equipped with handlebars 24*b* that is projected to the left and right from a dashboard 24*a*, drive levers 24*c* that is also projected to the left and right for allowing the operator to input drive and stop commands, a speed setting knob 24*d* located on the dashboard 24*a* to enable the operator to set stepless speed between, for example, 1 km/h and 6 km/h, a forward-reverse switch 24*e* for allowing the operator to input power wheelchair 12 travel direction commands (forward and reverse commands) for switching the direction of travel between forward and reverse, a display 24*f* that displays a result of communication with the remote monitoring device 14 (explained later), etc.

Drive switches 24*g* are installed near the drive levers 24*c* to output signals indicating drive commands and stop commands inputted by the operator through the drive levers 24*c*. A speed setting knob sensor 24*h* is installed near the speed setting knob 24*d* to produce an output or signal proportional to the speed set by the operator through the speed setting knob 24*d*.

The operating unit 24 is further provided with an electronic keyport 24*i*. When the operator brings a non-contact electronic key (IC card, not shown) near or close to the electronic keyport 24*i*, the electronic keyport 24*i* reads authentication data from the memory of the electronic key, uses the authentication data to authenticate whether the electronic key is valid, and when valid, allows the power wheelchair 12 to be started. This configuration is made for preventing theft of the power wheelchair 12, by providing an immobility feature that permits supply of starting current from the battery 30 to the motor 26 only when a valid electronic key is brought near the electronic keyport 24*i*. However, as this feature is not directly related to this invention, no further explanation will be given here.

The explanation of the power wheelchair 12 will be continued with reference to FIG. 1. The communication unit 36 of the power wheelchair 12 is equipped with an electronic control unit (ECU) 40 for communication control (communication ECU), communication equipment 42 connected to the communication ECU 40, and other components. The communication ECU 40 comprises a microcomputer having a CPU 40*a*, a memory 40*b* for storing unique communication IDs (i.e., identification data (user ID) identifying the owner (operator) of the power wheelchair 12 and identification data (product ID) identifying the model or the like of the power wheelchair 12) and other information, a counter (not shown) and so on. The outputs of the acceleration sensor 32, GPS signal receiver 34 (power wheelchair 12 location data) and the like are inputted to the communication ECU 40.

The communication equipment 42 has a transceiving antenna 42*a*. In response to instructions from the communication ECU 40, it transmits wheelchair-stranded signals (explained later) and the like through a long-range wireless communication network (communicator) 44 to a remote monitoring device 14 which is installed at an appropriate location (e.g., the company manufacturing or marketing the power wheelchair 12) and includes a power wheelchair management server (computer). It also receives through the long-range wireless communication network 44 acknowledgement signals (explained later) transmitted by the remote monitoring device 14. The long-range wireless communication network 44 is a wireless communication network using a mobile phone frequency in the vicinity of 800 MHz and is excellent in communication reliability.

The power wheelchair 12 is also equipped with an ECU 46 for motor control (motor ECU) and an ECU 48 for display control (display ECU), each comprises a microcomputer having a CPU, ROM, RAM and the like (not shown). The ECUs 46 and 48 are communicatably connected with the communication ECU 40 through a controller area network (CAN).

The motor ECU 46 receives the outputs of the forward-reverse switch 24*e*, drive switch 24*g*, speed setting knob sensor 24*h*, etc., and controls the operation of the motor 26 and driving of the power wheelchair 12 based on these outputs. In addition to controlling the operation of the motor 26, the motor ECU 46 outputs a signal containing operation history data (e.g., operation time and/or travel distance of the power wheelchair 12) to the communication ECU 40 through CAN communication. The communication ECU 40 stores (accumulates) the received operation history data in its memory 40*b*.

The display ECU 48 is connected to the display 24*f* to control the operation thereof to display thereon the results of communication between the power wheelchair 12 and the remote monitoring device 14.

The remote monitoring device 14 is equipped with a CPU 14*a*, a database (DB) 14*b*, a transceiving antenna 14*c* for exchanging signals with the transceiving antenna 42*a* of the communication equipment 42, and other components.

Data defining a number of predesignated information addressees 50 is stored in the database 14*b* on an individual vehicle basis. To be specific, the database 14*b* stores data regarding a number of predesignated information addressees 50 to be contacted when any given power wheelchair 12 is stranded, as designated in advance for each vehicle, more exactly each unique communication ID.

The information addressees 50 include, for example, a dealer 50*a* that sold the power wheelchair 12, a data terminal 50*b* owned by the operator's (rider's) family (i.e., a personal computer at the family's home or a mobile phone), and a help desk 50*c* that contacts emergency assistance providers such as the police or a hospital. The data regarding the information addressees 50 therefore includes the telephone numbers, email addresses and the like of the information addressees 50.

The remote monitoring device 14 and information addressees 50 are linked to be able to communicate via, for example, an interne 52 (Worldwide Web or public telecommunication network) 52.

The operation of the vehicle monitoring system 10 configured as explained in the foregoing will now be explained.

Figure 4:
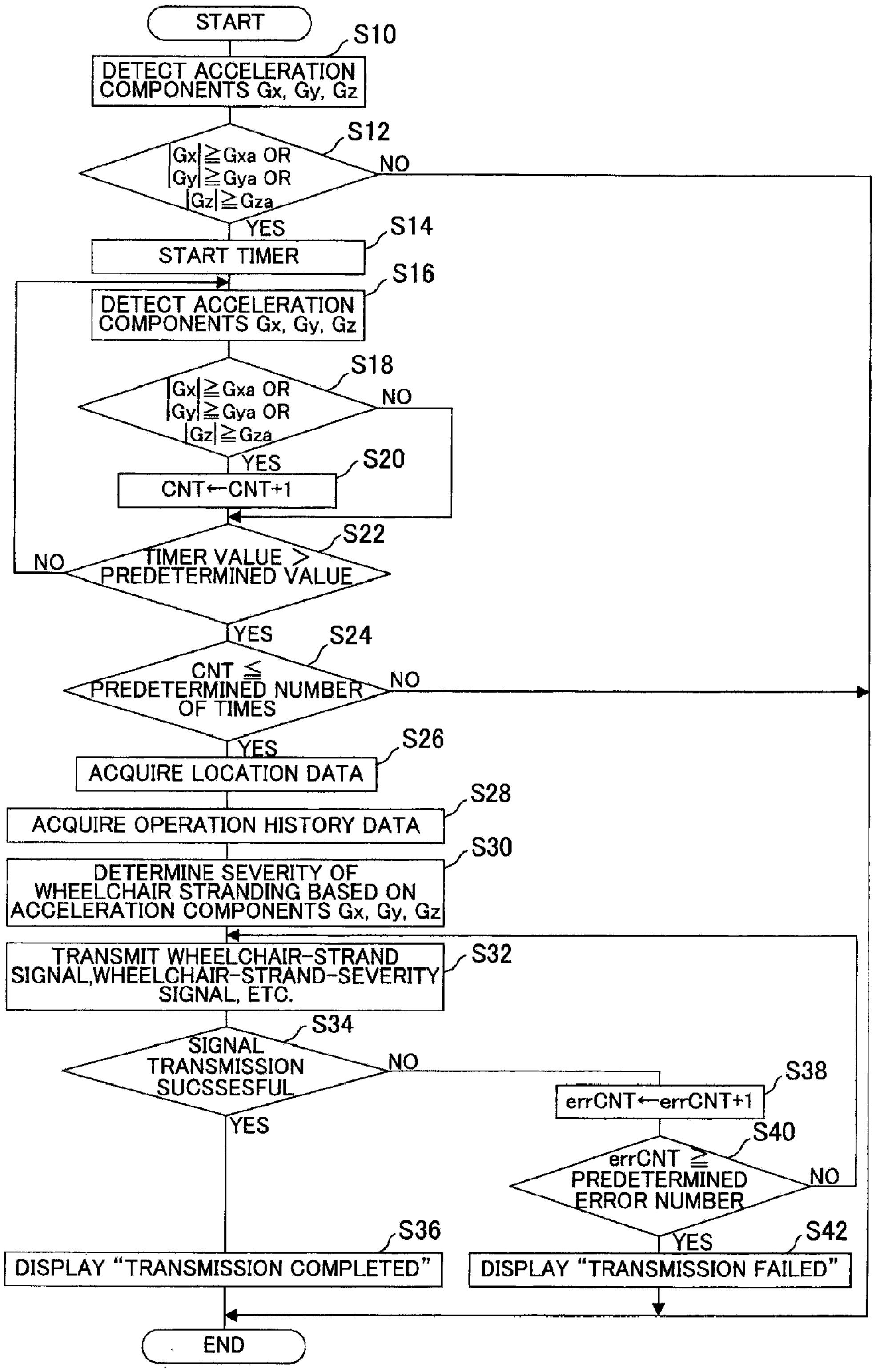
FIG. 4 is a flowchart showing the operation of the monitoring system shown in FIG. 1, specifically of a communication ECU thereof.

FIG. 4 is a flowchart showing the operation of the power wheelchair 12 that is a constituent of the vehicle monitoring system 10, specifically the operation of the communication ECU 40 of the power wheelchair 12.

First, in S10, the acceleration G acting on the power wheelchair 12, i.e., the acceleration components Gx, Gy and Gz in the X, Y and Z axis directions are detected (calculated) from the outputs of the acceleration sensor 32. Next, in S12, it is determined whether at least one of the absolute values of the detected acceleration components Gx, Gy and Gz is equal to or greater than a corresponding predetermined value (threshold value) Gxa, Gya or Gza.

The predetermined values Gxa, Gya and Gza are defined as values that, when exceeded, enable to determine that the power wheelchair 12 is likely stranded. For example, the predetermined value Gxa is defined as 1.0 [G], predetermined value Gya as 1.0[0], and predetermined value Gza as 1.2 [G].

When the result in S12 is NO, the remainder of the processing is skipped, and when it is YES, the program proceeds to S14, in which a timer (up-counter) is started. Next, in S16, the acceleration components Gx, Gy and Gz acting on the power wheelchair 12 are again detected (calculated), and then, in S18, it is determined, similarly to in S12, whether at least one of the absolute values of the acceleration components Gx, Gy and Gz detected in S16 is equal to or greater than the corresponding predetermined value (threshold value) Gxa, Gya or Gza.

The result in the first execution of the processing of S18 is YES because the result in S12 was YES, so the program proceeds to S20, in which a value of a counter CNT (initial value 0) is incremented by 1. Next, in S22, it is determined whether the timer value exceeds a prescribed value (prescribed time period t), i.e., it is determined whether the prescribed time period t has passed since it was determined in S12 that the power wheelchair 12 is likely stranded. The prescribed value, i.e., the prescribed time period t, is defined as, for example, 1.0 second.

As the first execution of S22 comes immediately after the timer was started in S14, the result in this step is normally NO, so that the program returns to S16 to repeat the processing of S16 to S22. When the result in S18 is NO during a repetition, the processing of S20 is skipped, i.e., the value of the counter CNT is not incremented.

Thus in the course of the processing from S16 to S22, the outputs of the acceleration sensor 32 (the acceleration components Gx, Gy and Gz) are compared with the predetermined values Gxa, Gya and Gza and the counter CNT counts the number of times that at least one output of the acceleration sensor 32 is equal to or greater than the corresponding predetermined value during the prescribed time period t.

When the result in S22 becomes YES upon the passage of the prescribed time period t, the program proceeds to S24, in which it is determined whether the count (counted number of times) of the counter CNT is equal to or less than a threshold value (predetermined number of times, e.g., 5 times). When the result in S24 is YES, it is determined that the power wheelchair 12 is stranded and the processing is continued from S26 onward, while when it is NO, the program is terminated.

In other words, a determination is made in S24 as to whether the power wheelchair 12 is stranded when the number of times counted by the counter CNT is equal to or less than the threshold value, while no determination as to whether it is stranded is made when the number of times counted exceeds the threshold value.

Figure 5:
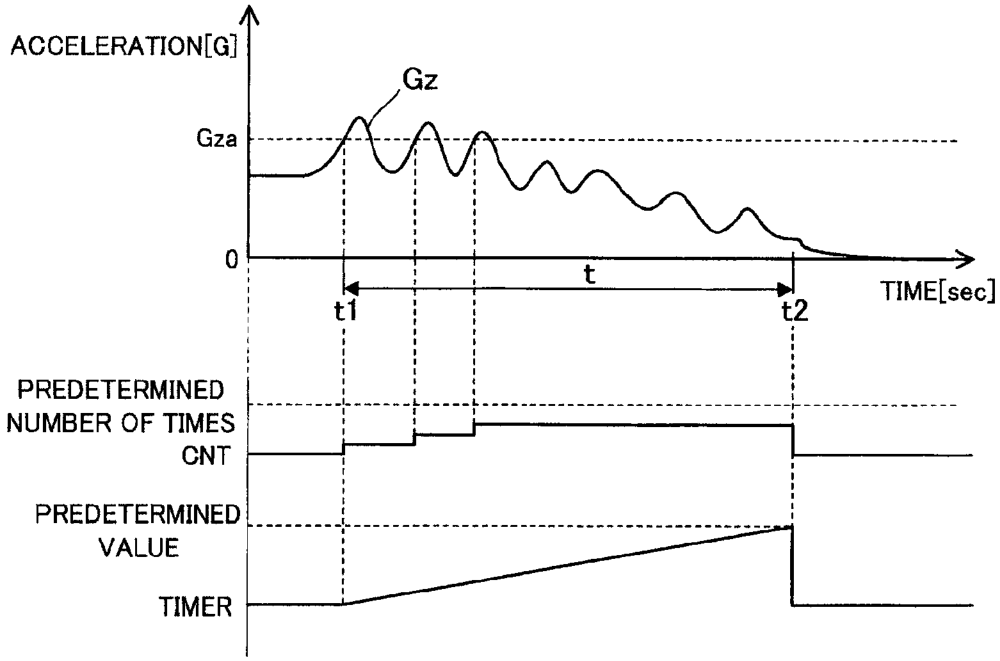
FIG. 5 is a time chart for explaining the processing of FIG. 4 flowchart.
Figure 6:
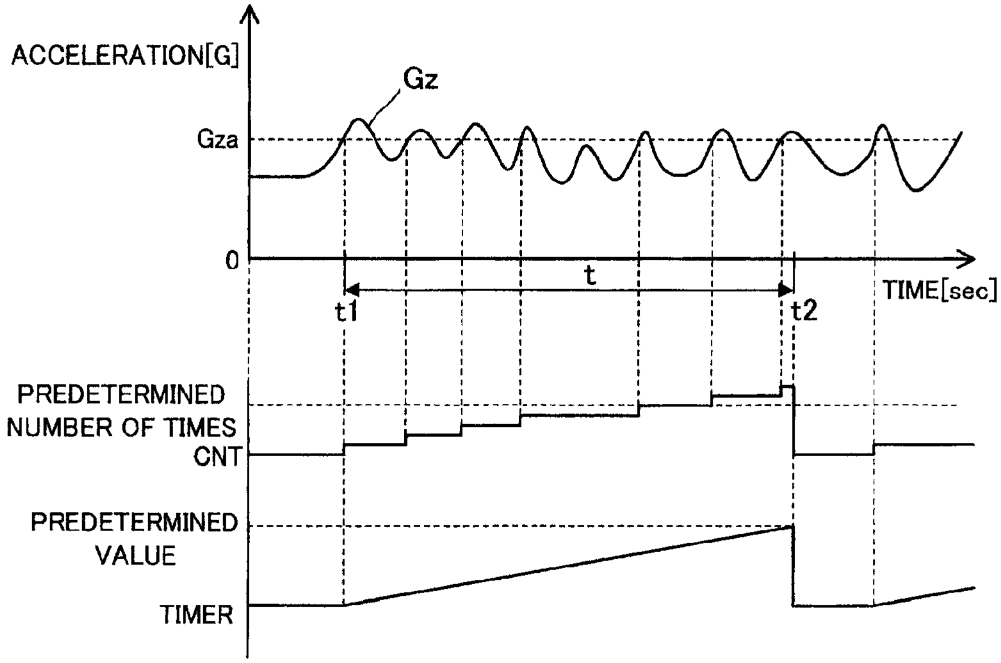
FIG. 6 is a time chart similar to FIG. 5, but for explaining the processing of FIG. 4 flowchart.

FIGS. 5 and 6 are time charts for explaining the processing from S10 to S24. FIG. 5 shows the outputs of the acceleration sensor 32 and the like in a case where the count of the counter CNT is less than the threshold value during the prescribed time period t. FIG. 6 shows the outputs of the acceleration sensor 32 and the like in a case where the count of the counter CNT is greater than the threshold value during the prescribed time period t. Although the acceleration sensor 32 outputs the acceleration components Gx, Gy and Gz in the three axial directions, FIGS. 5 and 6 are simplified for easier understanding by showing only the acceleration component Gz in the Z axis direction.

As shown in FIGS. 5 and 6, when the output of the acceleration sensor 32 (acceleration component Gz) at time t1 is equal to or greater than the predetermined value Gza (S10 and S12), the timer is started (S14) and a value of the counter CNT is incremented by 1 (S20). The processing from S16 to S22 is then repeatedly executed from time t1 until the prescribed time period t expires at time t2. As a result, the counter CNT counts the number of times that the output Gz of the acceleration sensor 32 equals or exceeds the predetermined value Gza during the prescribed time period t.

If the power wheelchair 12 should become stranded at this time because, for example, a wheel falls into a gutter or the vehicle contacts with an object (obstacle), the output Gz of the acceleration sensor 32 will, as shown in FIG. 5, once equal or exceed the predetermined value Gza at time t1 but thereafter diminish over time to eventually converge on a value less than the predetermined value Gza. Therefore, the count of the counter CNT does not come to exceed the threshold value when the power wheelchair 12 is stranded.

In contrast, when the power wheelchair 12 is traveling on an unpaved surface, for example, the bumpy surface produces relatively strong vibrations in the power wheelchair 12 that may cause the output Gz of the acceleration sensor 32 to become equal to or greater than the predetermined value Gza. In other words, it may happen that the output Gz of the acceleration sensor 32 becomes equal to or greater than the predetermined value Gza even though the power wheelchair 12 is not stranded but is only experiencing vibration and remains capable of driving. In such a case, the count of the counter CNT may come to exceed the threshold value, as shown in FIG. 6, the output Gz of the acceleration sensor 32 repeatedly rises above the predetermined value Gza.

Therefore, when the number of times that the output Gz of the acceleration sensor 32 equals or exceeds the predetermined value Gza during the prescribed time period t is counted (S16 to S22) and determined to be equal to or less than the threshold value, a determination is made as to whether the power wheelchair 12 is stranded, while no decision is made as to whether it is stranded when the number of times counted exceeds the threshold value (S24). This makes it possible to prevent mere vibration of the power wheelchair 12 from being misinterpreted as indicating that the power wheelchair 12 is stranded, thereby enabling more accurate detection of power wheelchair 12 stranding.

The explanation of FIG. 4 will be continued. When the result in S24 is YES, the program proceeds to S26, in which power wheelchair 12 location data is acquired (detected) from the output of the GPS signal receiver 34, and to S28, in which the operation history data stored (accumulated) in the memory **40*b*** is acquired (detected).

Next, in S30, based on the outputs of the acceleration sensor 32 (acceleration components Gx, Gy and Gz), a determination or discrimination is made as to the severity of the stranding of the power wheelchair (subject vehicle) 12, namely, the degree to which the power wheelchair 12 is affected by the contact or the like that stranded it. Specifically, the power wheelchair 12 is determined or discriminated to have been stranded by a minor contact or the like when the acceleration components Gx, Gy and Gz are relatively small and to have been stranded by a rather serious contact when the acceleration components Gx, Gy and Gz are large.

Thus, how severely the power wheelchair 12 is stranded (how badly it is affected) is classified or discriminated into levels based on the outputs of the acceleration sensor 32.

Next, in S32, the wheelchair-stranded signal indicating that the power wheelchair (subject vehicle) 12 is stranded, the wheelchair-strand-severity signal indicating the severity of the stranding of the power wheelchair, its unique communication ID, and the data acquired in S26 to S30 regarding the power wheelchair 12 location, operating history and how severely it is stranded are transmitted to the remote monitoring device 14 via the communication equipment 42.

Next, in S34, it is determined whether the transmission of the wheelchair-stranded signal, etc., was successful. This is done by determining whether the remote monitoring device 14 returned an acknowledgement signal confirming receipt of the wheelchair-stranded signal and other data signals.

When the result in S34 is YES, the program proceeds to S36, in which the display ECU 48 controls to display a message such as "Transmission Completed" on the display 24*f*, thereby informing the operator that the wheelchair-stranded signal and other data signals were transmitted to the remote monitoring device 14.

On the other hand, when the result in S34 is NO, the program proceeds to S38, in which the count of an error counter errCNT is incremented by 1, and to S40, in which it is determined whether the number of errors counted by the error counter errCNT is equal to or greater than a predetermined error number (e.g., 5 times). As the count of the error counter errCNT is initially 0, the result in the first execution of S40 is NO and the program returns to S32 to resend the wheelchair-stranded signal, etc.

When the result in S40 is YES, i.e., when transmission of the wheelchair-stranded signal and other data signals failed 5 times, the program proceeds to S42, in which a message such as "Transmission Failed" is sent through the display control ECU 48 to be posted on the display 24*f*, thereby informing the operator that transmission of the wheelchair-stranded signal and other data signals failed, whereafter the program is terminated. This enables the operator to certainly recognize whether the transmission of the wheelchair-stranded signal and other data signals to the remote monitoring device 14 was completed (successful) or failed.

The operation of the remote monitoring device 14 that is a constituent of the vehicle monitoring system 10 will be explained next.

Figure 7:
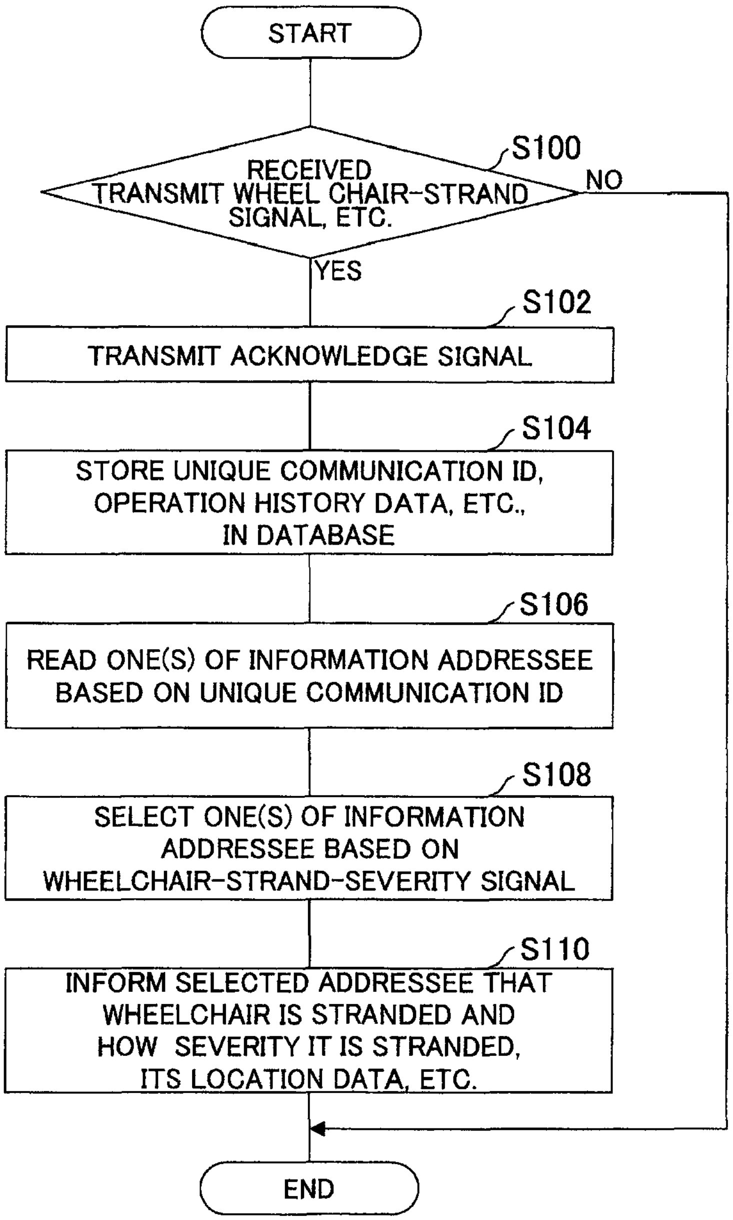
FIG. 7 is a flowchart showing the operation of the remote monitoring device shown in FIG. 1.

FIG. 7 is a flowchart showing the operation of the remote monitoring device 14. The program of this flowchart is repeatedly executed at regular intervals (e.g. every 10 milliseconds).

First, in S100, it is determined whether the remote monitoring device 14 has received from the communication ECU 40 of the power wheelchair 12 the wheelchair-stranded signal, wheelchair-strand-severity signal, unique communication ID, and signals including data on the power wheelchair 12 location, operating history and how severely the power wheelchair 12 is stranded. When the result in S100 is NC), the remaining processing steps are skipped, and when it is YES, the program proceeds to S102, in which the acknowledgement signal is transmitted to the communication ECU 40 of the power wheelchair 12.

Next, in S104, the unique communication ID, operation history data and other data are stored in the database 14*b*, whereafter the program proceeds to S106, in which based on the unique communication ID, one or ones of the associated information addressees 50 stored in the database 14*b* is read.

Next, in S108, the ones among the information addressees 50*a*, 50*b* and 50*c* suitable in light of the wheelchair-strand-severity signal is selected. Specifically, when the severity signal indicates that the power wheelchair 12 was stranded by a minor contact or the like, only the dealer 50*a* and the data terminal 50*b* of the operator's family are selected from among the information addressees 50. On the other hand, when the wheelchair-strand-severity signal indicates that the power wheelchair 12 was stranded by a rather serious contact or the like, all of the information addressees 50 are selected, namely the help desk 50*c* is selected in addition to the dealer 50*a* and the data terminal 50*b*.

Next, in S110, the information addressees selected in S108 are informed that the power wheelchair 12 is stranded and also informed of how severely it is stranded, its location data and the like, whereafter the program is terminated. Thus, the remote monitoring device 14 responds to the wheelchair-stranded signal by informing the predesignated information addressees 50 that the power wheelchair 12 is stranded.

A power wheelchair 12 repairperson (serviceperson) from the dealer 50*a* that received the communication concerned and/or a member of the family that received it through the data terminal 50*b* goes to the site of the stranded power wheelchair 12 indicated by the location data and the like to give appropriate assistance. Further, when the help desk 50*c* receives the communication, as this means that the power wheelchair 12 was stranded by a rather serious contact, the urgency of the situation is great. The help desk 50*c* therefore notifies the police, a hospital or other suitable information addressee to ensure that suitable action is promptly taken.

As stated in the foregoing, this embodiment is configured to have a system for and method of monitoring a low-speed mobility vehicle (power wheelchair 12) and having a remote monitoring device (14) adapted to be connected to the low-speed mobility vehicle through a communicator (long-range wireless communication network 44), comprising: an acceleration sensor (32, communication unit 36, communication ECU 40, communication equipment 42, S10, S16) that is installed at the vehicle (12) to produce an output indicative of acceleration acting on the vehicle; a vehicle-stranding determiner (communication unit 36, communication ECU 40, S12-S30) that is installed at the vehicle (12) and determines whether the vehicle strands based on the detected acceleration of the vehicle; a vehicle-stranded signal transmitter (36, 40, 42, S32-S42) that is installed at the vehicle (12) and transmits a vehicle-stranded signal indicating that the vehicle strands to the remote monitoring device (14) through the communicator; and an informer (CPU 14*a*, database 14*b*, transceiving antenna 14*c*, S100-S110) that is installed at the remote monitoring device (14) and informs to a predesignated information addressee (50) in response to the signal that the vehicle is stranded. With this, it becomes possible to respond rapidly and appropriately when the low-speed mobility vehicle 12 is under stranding condition.

The system and method further includes: a vehicle-strand-severity discriminator (communication unit 36, communication ECU 40, S30) that is installed at the vehicle (12) and discriminates severity of the stranding of the vehicle based on the detected acceleration of the vehicle when it is determined that the vehicle strands and generates a vehicle-strand-severity signal indicating the severity of the stranding of the vehicle to be transmitted by the vehicle-stranded signal transmitter (44) to the remote monitoring device (14); and the informer selects one of predesignated information addressees in light of the vehicle-strand-severity signal (S102-S110). The predesignated information addressees includes at least one of a dealer (50*a*) that sold the vehicle, a data terminal (50*b*) owned by an operator of the vehicle and emergency assistance providers (50*c*).

As a result, a configuration becomes possible wherein when the low-speed mobility vehicle 12 is relatively severely stranded, all of the information addressees 50*a*, 50*b* and 50*c* are informed or notified, but when the severity of the stranding is relatively low, i.e., when the low-speed mobility vehicle is not so seriously stranded, only some among the information addressees 50*a*, 50*b* and 50*c* (the information addressees 50*a* and 50*b*) are selected and notified. Therefore, stranding of the low-speed mobility vehicle can be dealt with in the most appropriate way for the severity of the situation.

The system and method further includes: a counter (communication unit 36, communication ECU 40, S16-S22) that counts a number of times that an output of the acceleration sensor is equal to or greater than a predetermined value during a prescribed time period; and the vehicle-stranding determiner determines that the vehicle strands when the counted number of times is equal to or less than a threshold value (S24). The acceleration sensor (32) produces the output each indicative of acceleration component in X, Y, Z axis direction (Gx, Gy, Gz), and the counter counts the number of times that the output of at least one acceleration component exceeds a corresponding one of the predetermined value (Gxa, Gya, Gza).

In other words, when the counted number of times is equal to or less than the threshold value (predetermined number), a determination is made as to whether the low-speed mobility vehicle 12 is stranded, while no determination is made as to whether it is stranded when the number of times counted exceeds the threshold value (predetermined number) (S24). This configuration makes it possible to prevent mere vibration of the low-speed mobility vehicle 12 from being misinterpreted as indicating that the low-speed mobility vehicle 12 is stranded, thereby enabling more accurate detection of low-speed mobility vehicle 12 stranding.

The system according further includes: a location finder (GPS signal receiver 34, S26) that finds a location of the vehicle; and the vehicle-strand signal transmitter produces a signal indicating the location of the vehicle to be transmitter to the remote monitoring device and informed by the informer (S32).

Although in the configuration explained in the foregoing, the equipments including the communication ECU 40 mounted on the power wheelchair 12 is communicatably connected to the remote monitoring device 14 through the communication equipment 42, this is not a limitation and it is possible instead adopt a configuration that uses mobile telephones possessed by the operators (riders) in place of the communication equipment 42. Specifically, the mobile telephones can be connected to the communication ECU 40 of the communication unit 36 through short-range wireless communication or the like and transmit the wheelchair-stranded signal, etc., from the associated mobile telephone to the remote monitoring device 14.

Further, although one acceleration sensor 32 is installed in the low-speed mobility vehicle 12, it can be multiple. Also, an inclination sensor may be applied instead of the acceleration sensor 32 to determine whether the vehicle 12 is stranded based on an output of the inclination sensor.

In addition, based on the outputs of the acceleration sensor 32, stranding of the low-speed mobility vehicle 12 is classified into two levels of severity: stranding owing to a minor contact or the like and stranding owing to a relatively serious contact or the like. However, this configuration is not a limitation and it is possible instead to classify stranding into three or more levels of severity. In such a configuration, the remote monitoring device 14 is of course configured to select appropriate ones among the information addressees 50*a*, 50*b* and 50*c* in accordance with the three or more levels of severity.

Further, the mounted equipments including the communication ECU 40 of the low-speed mobility vehicle 12 and remote monitoring device 14 are communicatably connected through the long-range wireless communication network 44, while the remote monitoring device 14 and information addressees 50 are communicatably connected through the internet 52. However, this configuration is not a limitation and it is possible instead to establish the connections through other wireless communication means or wired communication means.

Furthermore, although the predetermined values Gxa, Gya or Gza, threshold value (predetermined number of times), etc., are indicated with specific values in the foregoing, they are only examples and not limited thereto.

Japanese Patent Application No. 2008-292614 filed on Nov. 14, 2008, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for monitoring a low-speed mobility vehicle and having a remote monitoring device adapted to be connected to the low-speed mobility vehicle through a communicator, comprising:

an acceleration sensor that is installed at the vehicle to produce an output indicative of acceleration acting on the vehicle;

a counter that counts a number of times that each output of the acceleration sensor is equal to or greater than a predetermined value during a prescribed time period, wherein each output of the acceleration sensor is indicative of an acceleration component in one of X, Y, Z axis directions, and the counter counts the number of times that an output of at least one acceleration component exceeds a corresponding predetermined value in one of the X, Y, Z axis directions;

a vehicle-stranding determiner that is installed at the vehicle and determines that the vehicle strands upon detecting that the counted number of times is equal to or less than a threshold value;

a vehicle-strand-severity discriminator that is installed at the vehicle and discriminates a severity of the stranding of the vehicle in stages based on the detected acceleration of the vehicle when it is determined that the vehicle strands;

a vehicle-stranded signal transmitter that is installed at the vehicle and transmits a vehicle-stranded signal indicating that the vehicle strands to the remote monitoring device through the communicator; and an informer that is installed at the remote monitoring device and informs to a predesignated information addressee in response to the signal that the vehicle is stranded.

2. The system according to claim 1, wherein the vehicle-strand severity discriminator generates a vehicle-strand-severity signal indicating the severity of the stranding of the vehicle to be transmitted by the vehicle-stranded signal transmitter to the remote monitoring device, and the informer selects one of predesignated information addressees based on the vehicle-strand-severity signal.

3. The system according to claim 2, wherein the predesignated information addressees includes at least one of a dealer that sold the vehicle, a data terminal owned by an operator of the vehicle and emergency assistance providers.

4. The system according to claim 1, further comprising:

a location finder that detects a location of the vehicle, and wherein the vehicle-strand signal transmitter produces a signal indicating the location of the vehicle to be transmitted to the remote monitoring device and informed by the informer.

5. A method of monitoring a low-speed mobility vehicle using a remote monitoring device adapted to be connected to the low-speed mobility vehicle through a communicator, comprising:

detecting an acceleration acting on the vehicle comprising detecting acceleration components in X, Y, Z axis directions;

counting a number of times that each output of the acceleration is equal to or greater than a predetermined value during a prescribed time period comprising counting the number of times that at least one of the acceleration components exceeds a corresponding predetermined value in one of the X, Y, Z axis directions;

determining that the vehicle strands upon detecting that the counted number of times is equal to or less than a threshold value;

discriminating a severity of the stranding of the vehicle in stages based on the detected acceleration of the vehicle when it is determined that the vehicle strands;

transmitting a vehicle-stranded signal indicating that the vehicle strands to the remote monitoring device through the communicator; and informing to a predesignated information addressee in response to the signal that the vehicle is stranded.

6. The method according to claim 5, wherein the discriminating generates a vehicle-strand-severity signal indicating the severity of the stranding of the vehicle to be transmitted to the remote monitoring device, and the informing comprises selecting one of predesignated information addressees based on the vehicle-stand-severity signal.

7. The method according to claim 6, wherein the predesignated information addressees includes at least one of a dealer that sold the vehicle, a data terminal owned by an operator of the vehicle and emergency assistance providers.

8. The method according to claim 5, further comprising:

detecting a location of the vehicle, and wherein the transmitting comprises producing a signal indicating the location of the vehicle to be transmitted.

* * * * *